US012626143B2

(12) United States Patent
Chen et al.

(10) Patent No.: US 12,626,143 B2
(45) Date of Patent: May 12, 2026

(54) COMPOSITE ADVERSARIAL ATTACK MODEL TRAINING FOR NEURAL NETWORKS

(71) Applicants:International Business Machines Corporation, Armonk, NY (US); National Tsing Hua University, Hsinchu City (TW)

(72) Inventors: Pin-Yu Chen, White Plains, NY (US); I-Hsin Chung, Chappaqua, NY (US); Bo Wu, Cambridge, MA (US); Chuang Gan, Cambridge, MA (US); Lei Hsiung, Kaohsiung City (TW); Yun-Yun Tsai, Taipei City (TW); Tsung-Yi Ho, Hsinchu (TW)

(73) Assignees: International Business Machines Corporation, Armonk, NY (US); National Tsing Hua University, Hsinchu City (TW)

( * ) Notice: Subject to any disclaimer, the term of this patent is extended or adjusted under 35 U.S.C. 154(b) by 560 days.

(21) Appl. No.: 18/331,211

(22) Filed: Jun. 8, 2023

(65) Prior Publication Data

US 2024/0412074 A1      Dec. 12, 2024

(51) Int. Cl.
*G06N 3/094*        (2023.01)
(52) U.S. Cl.
CPC .................................... *G06N 3/094* (2023.01)
(58) Field of Classification Search
CPC ........... G06N 3/094; G06N 3/045; G06N 3/08
See application file for complete search history.

(56) References Cited

U.S. PATENT DOCUMENTS

| | | | |
|---|---|---|---|
| 11,227,215 B2 | 1/2022 | Liu et al. | |
| 11,397,891 B2 | 7/2022 | Liu et al. | |
| 11,443,069 B2 | 9/2022 | Liu et al. | |
| 2020/0265271 A1* | 8/2020 | Zhang | G06N 3/0464 |
| 2021/0089891 A1 | 3/2021 | Warren et al. | |

(Continued)

FOREIGN PATENT DOCUMENTS

| | | |
|---|---|---|
| CN | 112487931 A | 3/2021 |
| CN | 115083001 A | 9/2022 |

(Continued)

OTHER PUBLICATIONS

Ozbulak, Utku, et al. "Perturbation analysis of gradient-based adversarial attacks." Pattern Recognition Letters 135 (2020): 313-320. (Year: 2020).*

(Continued)

*Primary Examiner* — Michael R Vaughan
(74) *Attorney, Agent, or Firm* — CANTOR COLBURN LLP; Jordan Schiller

(57) ABSTRACT

Some embodiments of the present disclosure are directed to systems, computer-readable media, and computer-implemented methods for neural network training. Some embodiments are directed to determining an attack order schedule for the data sample that includes a plurality of adversarial perturbation attacks associated with the data sample, and performing a composite adversarial attack process against the data set using the determined attack order schedule to generate a perturbed data sample for the data sample. Other embodiments may be disclosed or claimed.

20 Claims, 4 Drawing Sheets

(56)     References Cited

U.S. PATENT DOCUMENTS

| | | | | |
|---|---|---|---|---|
| 2021/0279336 A1* | 9/2021 | Cmielowski | ........... | G06N 20/00 |
| 2021/0350004 A1* | 11/2021 | Rahnama-Moghaddam | ............... | |
| | | | | G06F 21/577 |
| 2022/0253714 A1 | 8/2022 | Chen et al. | | |
| 2022/0261626 A1 | 8/2022 | Liu et al. | | |
| 2022/0335335 A1* | 10/2022 | Basak | ..................... | G06F 21/54 |
| 2023/0094206 A1* | 3/2023 | Lu | ........................ | G06V 10/776 |
| | | | | 382/159 |

FOREIGN PATENT DOCUMENTS

| | | | | |
|---|---|---|---|---|
| DE | 112021007708 T5 * | 3/2024 | .......... | G06N 3/0442 |
| KR | 20220170473 A | 12/2022 | | |

OTHER PUBLICATIONS

Zhang, Haichao, and Jianyu Wang. "Joint adversarial training: Incorporating both spatial and pixel attacks." arXiv preprint arXiv: 1907.10737 (2019). (Year: 2019).*

Chen et al. "Ead: elastic-net attacks to deep neural networks via adversarial examples." Proceedings of the AAAI conference on artificial intelligence. vol. 32. No. 1. (2018): 28 pages.
Hsiung et al., "Toward Compositional Adversarial Robustess: Generalizing Adversarial Training to Composite Semantic Perturbations," arXiv:2202.04235v3, Mar. 21, 2023, pp. 1-21. (Grace Period Disclosure).
Laidlaw et al., "Perceptual adversarial robustness: Defense against unseen threat models." arXiv preprint arXiv:2006.12655, ICLR (2020): pp. 1-25.
Madry et al., "Towards deep learning models resistant to adversarial attacks." arXiv preprint arXiv:1706.06083, ICLR (2017): pp. 1-27.
Wong et al., "Fast is better than free: Revisiting adversarial training." arXiv preprint arXiv:2001.03994, ICLR (2020): pp. 1-17.
Wu et al., "Adversarial weight perturbation helps robust generalization." Advances in Neural Information Processing Systems 33 (2020): pp. 1-20.
Zhang et al., "Attacks which do not kill training make adversarial learning stronger." International conference on machine learning. PMLR, (2020): 27 pages.
Zhang et al., "Theoretically principled trade-off between robustness and accuracy." International conference on machine learning. ICML, (2019): pp. 1-31.

* cited by examiner

400

RETRIEVE DATA SET — 405

DETERMINE ATTACK ORDER SCHEDULE — 410

OPTIMIZE ATTACKS — 415

PERFORM COMPOSITE ADVERSARIAL ATTACK PROCESS — 420

1

COMPOSITE ADVERSARIAL ATTACK MODEL TRAINING FOR NEURAL NETWORKS

STATEMENT REGARDING PRIOR DISCLOSURES BY THE INVENTOR OR A JOINT INVENTOR

The following disclosure is submitted under 35 U.S.C. 102(b)(1)(A): HSIUNG et al., "Toward Compositional Adversarial Robustess: Generalizing Adversarial Training to Composite Semantic Perturbations," arXiv:2202.04235v3, 21 Mar. 2023, pp 1-21.

BACKGROUND

Embodiments of the present invention generally relate to neural networks, and more specifically, to computer systems, computer-implemented methods, and computer program products for training neural network models using composite adversarial attacks.

Deep neural networks (DNNs) are machine learning systems that have been widely deployed in applications such as biometric authentication (e.g., facial image recognition), medical diagnosis (e.g., CT lung cancer detection) and autonomous driving systems (e.g., traffic sign classification). However, while these models can achieve outstanding performance on benign data points, recent research has shown that state-of-the-art models can be easily fooled by malicious data points crafted intentionally with adversarial perturbations. A simple example of such a perturbation could include a data sample including an image stored in an electronic format (e.g., JPEG) being mislabeled (e.g., an image of a dog being labeled as a "cat").

Other features of such a data sample may likewise be subject to adversarial attacks that introduce perturbations affecting the image's hue, saturation, brightness, contrast, etc. Data items in other formats (e.g., text, video, etc.) may likewise be manipulated. Embodiments of the present invention address these and other issues by providing enhanced methods for neural network model training that provide robust models to help defend against such adversarial attacks.

SUMMARY

Embodiments of the present invention are directed to computer systems, computer-readable media, and computer-implemented methods for training neural network models using composite adversarial attacks. One exemplary embodiment includes a computer system comprising a processor and a memory coupled to the processor. The memory stores instructions that, when executed by the processor, cause the computer system to: retrieve a data set for a neural network that includes a data sample stored in an electronic file format; determine, based on the data set, an attack order schedule for the data sample that includes a plurality of adversarial perturbation attacks associated with the data sample, wherein each respective attack: has a respective type, includes a respective attack power value, and includes a respective perturbation interval; optimize each respective attack and its respective ordering in the attack order schedule using an iterative gradient descent process; and perform a composite adversarial attack process against the data set using the determined attack order schedule to generate a perturbed data sample for the data sample, the perturbed data sample having a common electronic file format to the data sample.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
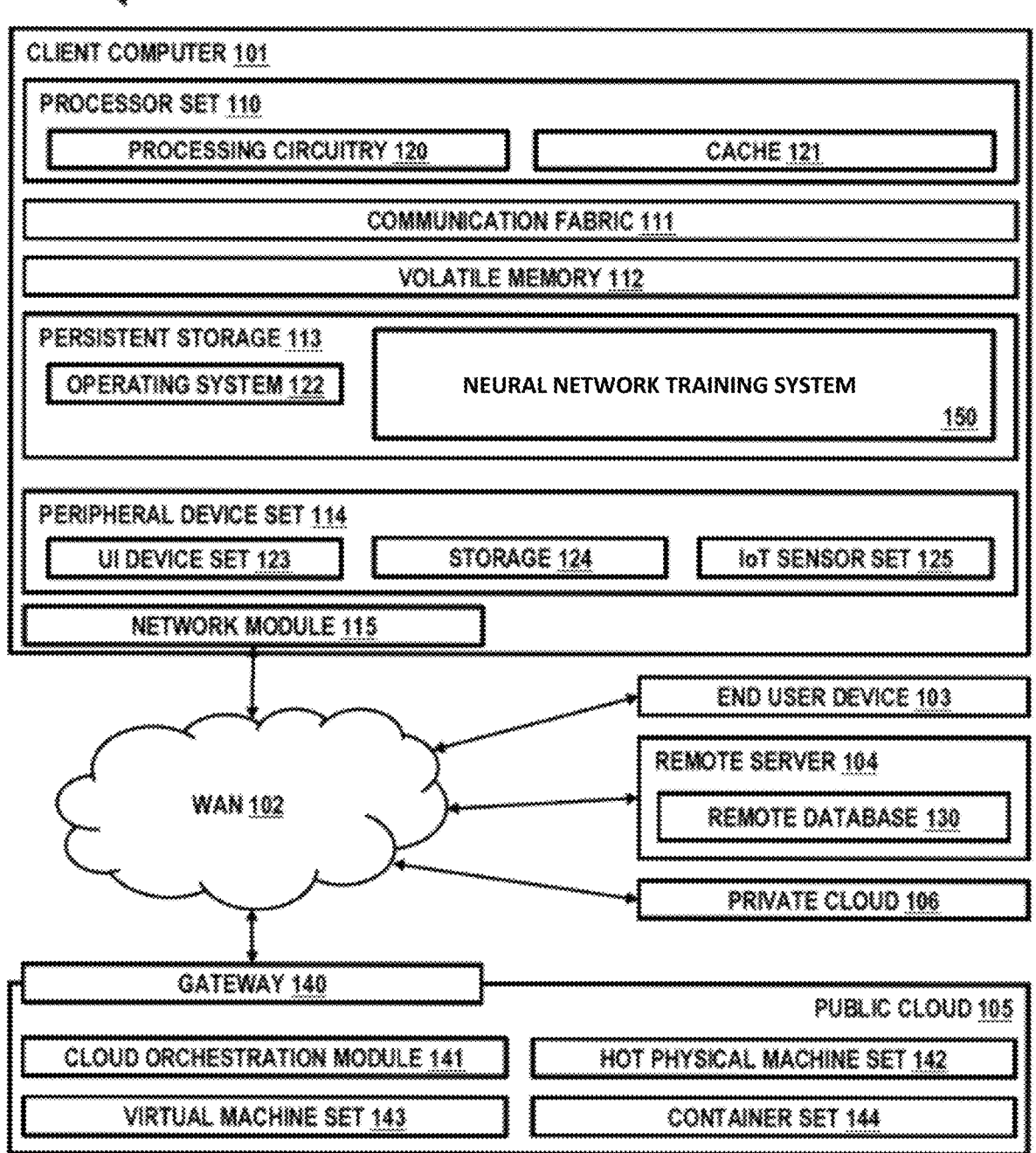
FIG. 1 is a block diagram illustrating an example of a computer system for use in conjunction with one or more embodiments of the present invention.

Disclosed herein are methods, systems, and computer program products for neural network training. Among other things, embodiments of the present disclosure can train neural network models to identify adversarial perturbations in data sets more effectively and completely than in conventional systems, thereby improving the level of accuracy of machine-learning-based systems.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums" or "computer-readable mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as a neural network training system 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
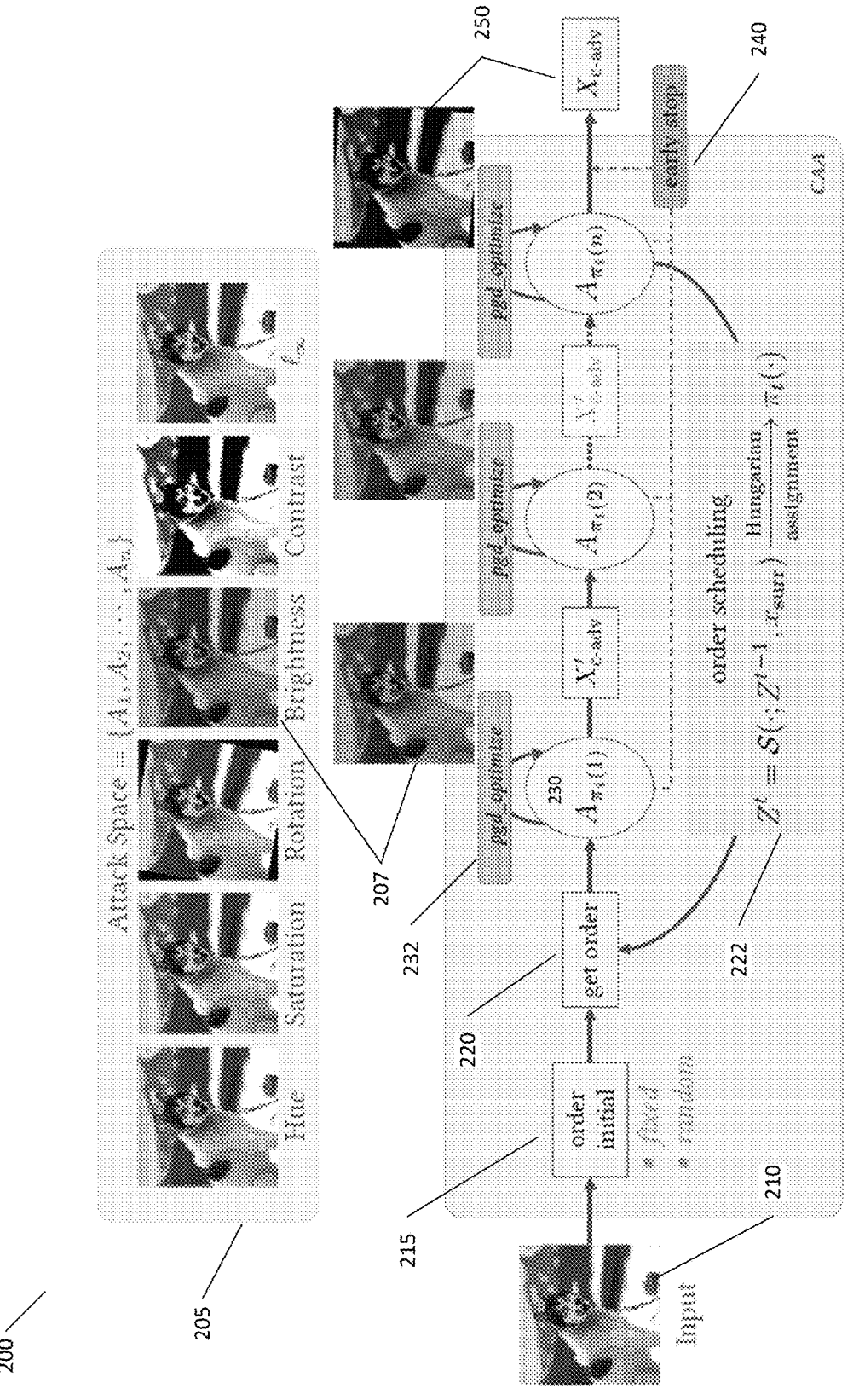
FIG. 2 is a functional block diagram illustrating an example of training a neural network in accordance with one or more embodiments of the present invention.

FIG. 2 provides a functional block diagram illustrating an example of a process 200 for neural network training in accordance with one or more embodiments of the present invention. Process 200 may be performed by any suitable device or combination of devices. In some exemplary embodiments, the process 200 illustrated in FIG. 2 may be performed by the neural network training system 150 depicted in FIG. 1.

In this example, process 200 is a composite adversarial attack (CAA) process that includes, at block 210, retrieving a data set for a neural network that includes a data sample stored in an electronic file format. This example of the CAA process 200 is directed to an image classifier that takes a data set comprising one or more image data items and generates d-dimensional prediction scores (e.g., Softmax outputs) for d classes. In this example, block 210 indicates a data sample comprising an image of a dog (e.g., stored in JPEG format).

Block 205 represents an attack space (also referred to herein as an "attack space") comprising a plurality of adversarial perturbation attacks associated with the data sample at block 210. In this example, attacks A1 to An include an attack type that modify the data sample's image features. For example, A1 is an attack type for the image's hue. The other attack types target the image's saturation, rotation, brightness, and contrast. The attack pool at block 205 may be represented according to: $\Omega = \{A_1, \ldots, A_n\}$.

At block 215 the system 150 identifies an initial ordering of the attacks in attack space 205 (e.g., fixed or randomized) and proceeds at block 220 and 222 to determine an attack order schedule for the data sample that includes the plurality of adversarial perturbation attacks from attack space 205. For each attack Ak, the system 150 may define a corresponding perturbation interval (boundary) $\epsilon k = [\alpha k, \beta k]$ to govern the attack power of Ak. The system may further determine the corresponding perturbation intervals of $\Omega$ as $E = \{\epsilon k | k \ \epsilon \ \{1, \ldots, n\}\}$.

Block 230 illustrates applying the first attack in the attack order schedule, which is attack A4 207 from attack pool 205 that modifies the brightness level of the data sample received at block 210. At block 232 the system 150 optimizes the first attack and its ordering in the attack order schedule using a projected gradient descent (PGD) process. The system may perform an early stop at block 240 to help the CAA process maintain its attack efficiency. The system 150 subsequently applies and optimizes the remaining attacks from attack pool 205 to generate a perturbed data sample 250 which may be described according to: xc-adv=A$\pi$i(n)(A$\pi$i(n−1)(• • • A$\pi$i (1)(x))), which may define the perturbed image 250 after a series of attacks (A$\pi$i(1)→A$\pi$i(2)→ • • • →A$\pi$i(n)). Here, $\pi$i(•) is an assignment function, used to assign the attack order, which indicates which attack should be used at step 1, 2, . . . , n.

For example, if there are n=3 attacks: rotation (1), brightness (2), and contrast (3), the system 150 may decide the order of these three attacks applied to the image according to $\pi$i(•), (e.g., 1→2→3, 2→1→3, 3→2, . . . ). The variable i is to specify the round of scheduling. After each attack scheduling, the respective attack and its order in the schedule may be optimized (e.g., as shown at block 232 for the first attack) to help improve the performance of the attacks.

As illustrated in FIG. 2, the data sample 205 is perturbed according to each attack in the attack order schedule. More broadly, an input x is perturbed in the order of: A$\pi$i(1)→A$\pi$i (2)→ • • • →A$\pi$i(n). For each attack operation Ak $\epsilon$ $\Omega$, an input x is transformed to a perturbed sample with a specific perturbation level $\delta$k, where $\delta$k $\epsilon$ $\epsilon$k may be optimized via projected gradient descent (PGD), maximizing the classification error (e.g., cross-entropy loss L). Therefore, the operation of Ak(x; $\delta$k) could be expressed as optimizing $\delta$k, that is: arg max $\delta$k$\epsilon$$\epsilon$k L(F(Ak(x; $\delta$k)), y). This preceding equation may be used to define how each attack is been optimized, such that a model F would have maximal loss (L) with respect to ground-truth label y. In the preceding equation, $\delta$k is a value in the perturbation range $\epsilon$k. For example in a perturbation affecting rotation of an image, $\delta$k=5° may indicate that if image x is rotated 5°, the loss L would have maximal value, representing that F would more likely to predict Ak(x; 5°) as not y. where y is the ground-truth label of x. This may also be referred to as component-wise PGD (Comp-PGD).

In some embodiments, assignment function $\pi$i(•) is a permutation matrix (or Birkhoff polytope), and may be optimized by treating it as a (relaxed) scheduling matrix Zi=[z1, . . . zn] T where Zi is an n x n matrix that used to optimize and define the assignment function $\pi$i(•). The Zi matrix may also be a doubly stochastic matrix, and the Hungarian algorithm may be used to obtain an optimal attack order assignment. The system 150 may determine the CAA's attack order scheduling in a constrained optimization manner.

In some embodiments, since xc-adv contains only one attack perturbation at each iteration, using it alone may be challenging to optimize the likelihood of other attacks in the relaxed scheduling matrix. To manage this issue, the system 150 may generate a surrogate composite adversarial image xsurr to relax the restriction and compute the loss for updating the scheduling matrix Z by weighting each type of attack perturbation with its corresponding probability at each iteration. Accordingly, in some embodiments the system 150 may optimize the scheduling matrix Z via maximizing the corresponding loss L(F(xsurr), y). Given the attack pool $\Omega$ of n attacks, the surrogate data sample may be computed for n iterations.

In some embodiments, the system 150 may optimize the attack order over a doubly stochastic matrix Z based on a maximization approach with a convex solution set. After deriving an updated scheduling matrix, the system 150 may utilize the Hungarian assignment algorithm in conjunction with the updated scheduling matrix to obtain the updated order assignment function $\pi$t(•).

Figure 3:
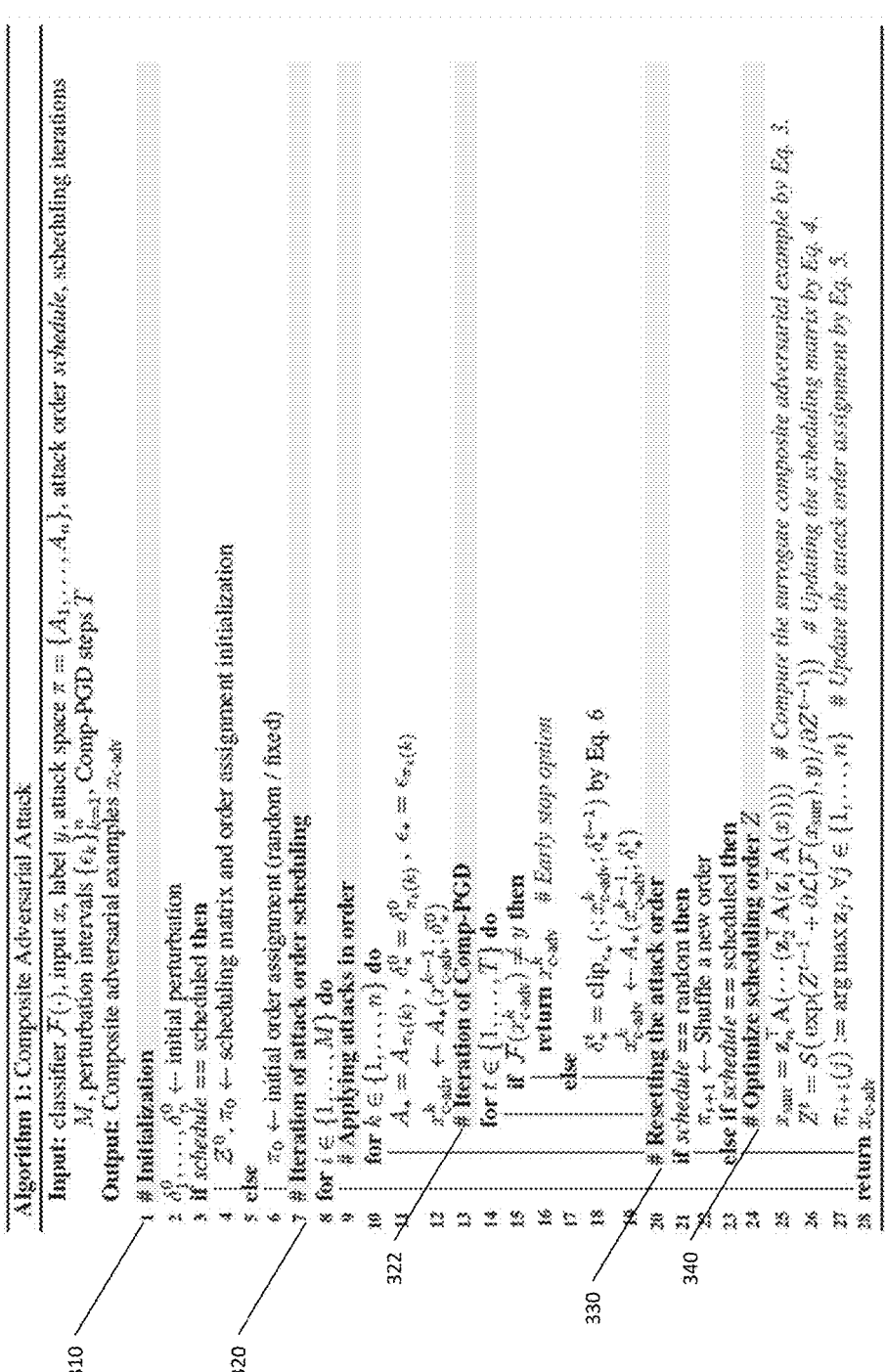
FIG. 3 illustrates an example of a process for training a neural network model in accordance with various embodiments of the disclosure.

FIG. 3 illustrates an example of a process for training a neural network model using CAA in accordance with various embodiments of the disclosure. Process 300 may be performed by system 150 in FIG. 1, as well as by any combination of other suitable systems and devices. In this example, process 300 includes determining initial attack ordering at 310 (lines 1-6). At 320 (lines 7-19), the system 150 iterates through M scheduling iterations to apply each attack in the attack space A1-An to the data sample input x. At 330, the system 150 may reset the order of the attacks in the attack space by reshuffling them for a randomized schedule (lines 20-22) or optimizing the scheduling ordering, at 340, using surrogate composite adversarial image xsurr as described above (lines 24-27).

9

10

Figure 4:
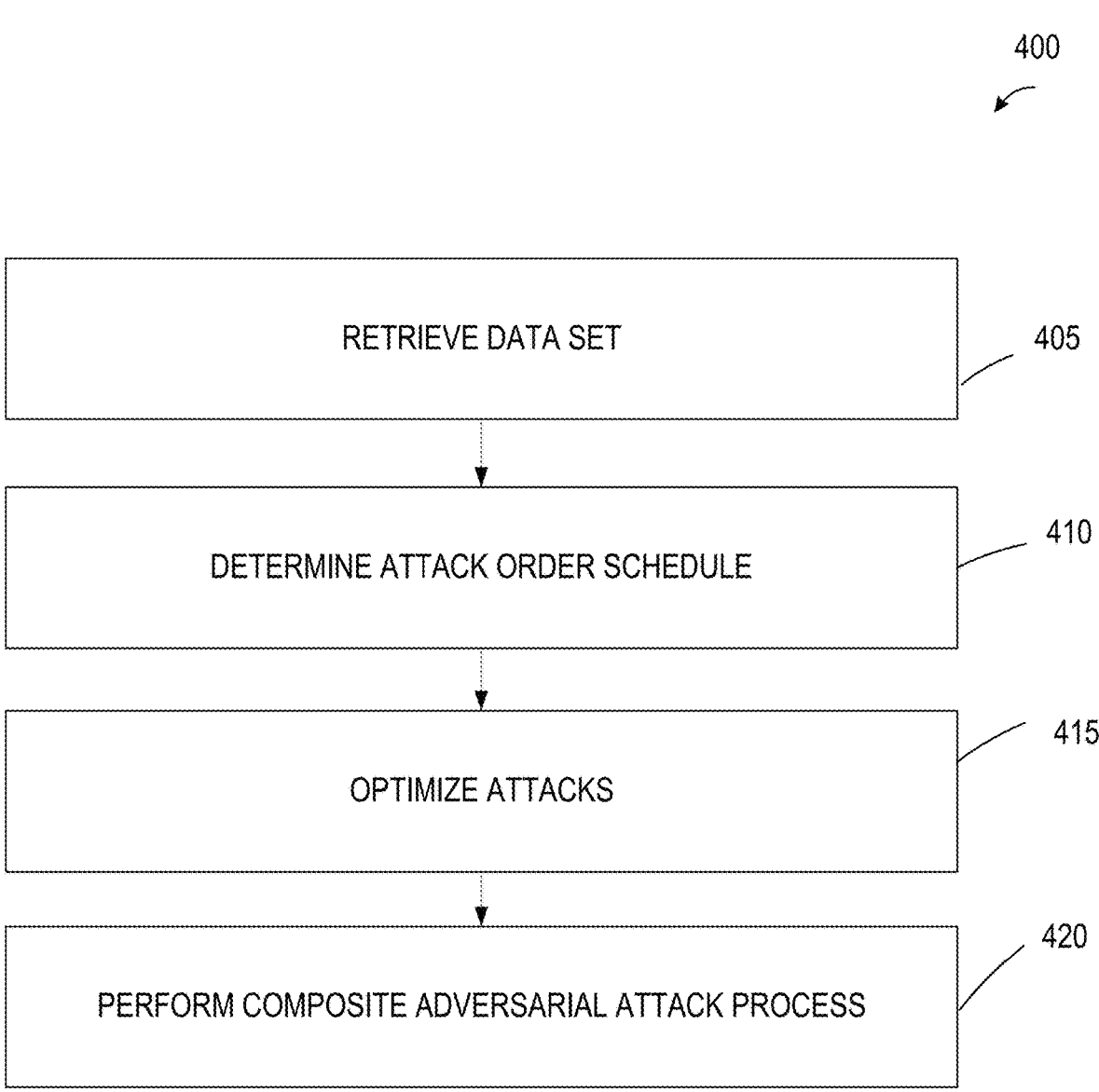
FIG. 4 is a flowchart of a method for training a neural network model in accordance with one or more embodiments of the present invention.

FIG. 4 illustrates an example of a process for neural network training in accordance with various embodiments of the present disclosure. Process 400 may be performed by any suitable system or combination of systems, such as neural network training system 150 in FIG. 1. In this example, process 400 includes, at 405, retrieving a data set for a neural network that includes a data sample. In some embodiments, the data set includes a plurality of data samples stored in an electronic file format. For example, the data sample may comprises at least one of: text, an image, audio, and video.

Process 400 further includes, at 410, determining, based on the data set, an attack order schedule for the data sample. In some embodiments, the attack order schedule includes a plurality of adversarial perturbation attacks associated with the data sample, wherein each respective attack: has a respective type, includes a respective attack power value, and includes a respective perturbation interval.

Process 400 further includes, at 415, optimizing each respective attack and its respective ordering in the attack order schedule. In some embodiments, the attack is optimized using an iterative gradient descent process. In some embodiments, optimizing each respective attack and its respective ordering in the attack order schedule is performed dynamically during the performing of the composite adversarial attack process.

Process 400 further includes, at 420, performing a composite adversarial attack process against the data set using the determined attack order schedule to generate a perturbed data sample for the data sample. The perturbed data sample may have a common electronic file format to the data sample. In some embodiments, performing the composite adversarial attack process against the data set includes modifying the perturbed data sample after each subsequent attack in the plurality of adversarial perturbation attacks.

In some embodiments, determining the attack order schedule for the data sample includes generating a scheduling matrix that includes a respective surrogate composite adversarial data sample associated with a modification to the data sample from each respective attack. In some embodiments, optimizing each respective attack and its respective ordering in the attack order schedule includes applying a Sinkhorn normalization operation to the scheduling matrix to generate an updated scheduling matrix.

Embodiments of the present disclosure may operate in conjunction with data stored in a variety of different electronic formats. In some embodiments, the data set includes a data sample comprising at least one of: text, an image, audio, and video.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising:

a processor; and a memory coupled to the processor and storing instructions that, when executed by the processor, cause the computer system to:

retrieve a data set for a neural network that includes a data sample stored in an electronic file format;

determine, based on the data set, an attack order schedule for the data sample that includes a plurality of adversarial perturbation attacks associated with the data sample, wherein each respective attack: has a respective type, includes a respective attack power value, and includes a respective perturbation interval;

optimize each respective attack and its respective ordering in the attack order schedule using an iterative gradient descent process; and perform a composite adversarial attack process against the data set using the determined attack order schedule to generate a perturbed data sample for the data sample, the perturbed data sample having a common electronic file format to the data sample.

2. The computer system of claim 1, wherein the data sample comprises at least one of: text, an image, audio, and video.

3. The computer system of claim 1, wherein optimizing each respective attack and its respective ordering in the attack order schedule is performed dynamically during the performing of the composite adversarial attack process.

4. The computer system of claim 1, wherein performing the composite adversarial attack process against the data set includes modifying the perturbed data sample after each subsequent attack in the plurality of adversarial perturbation attacks.

5. The computer system of claim 1, wherein determining the attack order schedule for the data sample includes optimizing an assignment function to yield a maximum classification error.

6. The computer system of claim 1, wherein determining the attack order schedule for the data sample includes generating a scheduling matrix that includes a respective surrogate composite adversarial data sample associated with a modification to the data sample from each respective attack.

7. The computer system of claim 6, wherein optimizing each respective attack and its respective ordering in the attack order schedule includes applying a Sinkhorn normalization operation to the scheduling matrix to generate an updated scheduling matrix.

8. The computer system of claim 7, wherein optimizing each respective attack and its respective ordering in the attack order schedule includes applying a Hungarian assignment process to the updated scheduling matrix.

9. A computer-readable storage medium storing instructions that, when executed by a computer system, cause the computer system to:

retrieve a data set for a neural network that includes a data sample stored in an electronic file format, wherein the data sample comprises at least one of: text, an image, audio, and video;

determine, based on the data set, an attack order schedule for the data sample that includes a plurality of adversarial perturbation attacks associated with the data sample, wherein each respective attack: has a respective type, includes a respective attack power value, and includes a respective perturbation interval;

optimize each respective attack and its respective ordering in the attack order schedule using an iterative gradient descent process; and perform a composite adversarial attack process against the data set using the determined attack order schedule to generate a perturbed data sample for the data sample, the perturbed data sample having a common electronic file format to the data sample.

10. The computer-readable storage medium of claim 9, wherein optimizing each respective attack and its respective ordering in the attack order schedule is performed dynamically during the performing of the composite adversarial attack process.

11. The computer-readable storage medium of claim 9, wherein performing the composite adversarial attack process against the data set includes modifying the perturbed data sample after each subsequent attack in the plurality of adversarial perturbation attacks.

12. The computer-readable storage medium of claim 9, wherein determining the attack order schedule for the data sample includes optimizing an assignment function to yield a maximum classification error.

13. The computer-readable storage medium of claim 9, wherein determining the attack order schedule for the data sample includes:

generating a scheduling matrix that includes a respective surrogate composite adversarial data sample associated with a modification to the data sample from each respective attack;

applying a Sinkhorn normalization operation to the scheduling matrix to generate an updated scheduling matrix; and applying a Hungarian assignment process to the updated scheduling matrix.

14. A computer-implemented method comprising:

retrieving, by a computer system, a data set for a neural network that includes a data sample stored in an electronic file format, wherein the data sample comprises at least one of: text, an image, audio, and video;

determining, by the computer system based on the data set, an attack order schedule for the data sample that includes a plurality of adversarial perturbation attacks associated with the data sample, wherein each respective attack: has a respective type, includes a respective attack power value, and includes a respective perturbation interval;

optimizing, by the computer system, each respective attack and its respective ordering in the attack order schedule using an iterative gradient descent process; and performing, by the computer system, a composite adversarial attack process against the data set using the determined attack order schedule to generate a perturbed data sample for the data sample, the perturbed data sample having a common electronic file format to the data sample.

15. The computer-readable medium of claim 14, wherein optimizing each respective attack and its respective ordering in the attack order schedule is performed dynamically during the performing of the composite adversarial attack process.

16. The computer-readable medium of claim 14, wherein performing the composite adversarial attack process against the data set includes modifying the perturbed data sample after each subsequent attack in the plurality of adversarial perturbation attacks.

17. The computer-readable medium of claim 14, wherein determining the attack order schedule for the data sample includes optimizing an assignment function to yield a maximum classification error.

18. The computer-readable medium of claim 14, wherein determining the attack order schedule for the data sample includes generating a scheduling matrix that includes a respective surrogate composite adversarial data sample associated with a modification to the data sample from each respective attack.

19. The computer-readable medium of claim 18, wherein optimizing each respective attack and its respective ordering in the attack order schedule includes applying a Sinkhorn normalization operation to the scheduling matrix to generate an updated scheduling matrix.

20. The computer-readable medium of claim 19, wherein optimizing each respective attack and its respective ordering in the attack order schedule includes applying a Hungarian assignment process to the updated scheduling matrix.

\*　　\*　　\*　　\*　　\*